(12) United States Patent
Zhou

(10) Patent No.: US 9,775,381 B2
(45) Date of Patent: Oct. 3, 2017

(54) TOUCH BATTERY

(71) Applicant: SHENZHEN BAUWAY TECHNOLOGY LIMITED, Shenzhen, Guangdong (CN)

(72) Inventor: Xuewu Zhou, Guangdong (CN)

(73) Assignee: SHENZHEN BAUWAY TECHNOLOGY LIMITED, Shenzhen, Guangdong (CN)

( * ) Notice: Subject to any disclaimer, the term of this patent is extended or adjusted under 35 U.S.C. 154(b) by 129 days.

(21) Appl. No.: 14/287,384

(22) Filed: May 27, 2014

(65) Prior Publication Data
US 2015/0125725 A1    May 7, 2015

(30) Foreign Application Priority Data

Nov. 6, 2013   (CN) .......................... 2013 2 0699459

(51) Int. Cl.
| | |
|---|---|
| *H01M 10/42* | (2006.01) |
| *H01M 10/48* | (2006.01) |
| *H01M 10/052* | (2010.01) |
| *H01M 2/10* | (2006.01) |
| *A24F 47/00* | (2006.01) |

(52) U.S. Cl.
CPC ......... *A24F 47/008* (2013.01); *H01M 2/1055* (2013.01); *H01M 2220/30* (2013.01)

(58) Field of Classification Search
USPC ..................................... 429/90, 98
See application file for complete search history.

(56) References Cited

U.S. PATENT DOCUMENTS

2011/0304282 A1* 12/2011 Li ........................ A24F 47/008
315/362

* cited by examiner

*Primary Examiner* — Osei Amponsah
(74) *Attorney, Agent, or Firm* — Jackson IPG PLLC; Demian K. Jackson

(57) ABSTRACT

A touch battery has a short contact member, an insulating ring, an intermediate threaded connector, a PCBA control panel, a touch member, a tail membrane, a battery pole having a battery provided therein, and a tobacco rod. The battery supplies input power for the PCBA control panel. The PCBA control panel is electrically connected to the short contact member and the touch member, respectively. The battery pole is disposed in the tobacco rod. The tobacco rod is connected to the short contact member via the intermediate threaded connector. The short contact member is disposed inside the intermediate threaded connector via the insulating ring. The tail membrane is connected to the touch member. The battery is allowed to output normally in a constant-voltage touch manner, so that the conventional manual output with keys is avoided, and the demands of consumers for multiple selections are met.

8 Claims, 9 Drawing Sheets

TOUCH BATTERY

FIELD OF THE INVENTION

The present invention relates to a touch battery, and particularly to a touch battery for an electronic cigarette.

BACKGROUND OF THE INVENTION

At present, electronic cigarettes include key electronic cigarettes or air-switch electronic cigarettes. The keys may be disabled or stuck after long-term use due to limited number of times or man-made damage. When put in clothes, electronic cigarettes may work sometimes if the keys are pressed unconsciously, so there is a certain issue of safety. In operation, it is required to press and hold the keys hard to enable the electronic cigarettes to work.

The rise of capacitive touch technology brings great convenience for people's production and life. Capacitive touch technology refers to that touch detection is performed in a number of lattice points intersected horizontally and vertically and then charge levels at contact points are detected, so that it is determined whether a finger touches a sensing surface by monitoring the small change in capacitance and then information about the position of a touch point is acquired by detecting the change rule of capacitance of the lattice points.

From the composition of capacitive lattice points, capacitive touch includes self-capacitive touch and mutual-capacitive touch.

The structural principle of mutual-capacitive touch is shown in FIG. 5 and FIG. 6. Capacitive lattice points are formed of longitudinal sensing lines and transverse drive lines. The point of intersection of the two lines has mutual capacitance. If a finger of a person approaches to this point, the electric field lines of a part of mutual capacitance will be absorbed because the human body may be equivalent to a potential; equivalently, the mutual capacitance is reduced. If the capacitance of each of the lattice points is scanned continuously, the position touched by a person may be acquired. The mutual capacitance may be formed on a plane, that is, capacitive lattice points may realize mutual-inductance on a single plane, as shown in FIG. 7.

The structural principle of self-capacitive touch is shown in FIG. 8. As the human body may be equivalent to a fixed potential, when the human body gets close to a sensing line, the capacitance of the sensing line to the ground (the human body may be regarded as the ground) will increase, that is, the self-capacitance thereof increases. For example, when a point (X1, Y2) is touched, the capacitances of X1 and Y2 become larger, and therefore the touch position may be determined. By continuously scanning the capacitance of each line to the ground (or a certain fixed potential), a touch coordinate may be determined. However, on an electronic cigarette, the area of a capacitive touch portion is pretty small, and this demand is extremely urgent particularly with a technical development trend of small but excellent at present. It is required to calculate capacitance by software and finally fit it with the structure of the electronic cigarettes to achieve the best touch effect.

SUMMARY OF THE INVENTION

To solve the problems in the prior art, the present invention provides a touch battery, including a short contact member, an insulating ring, an intermediate threaded connector, a PCBA control panel, a touch member, a tail membrane, a battery pole having a battery provided therein, and a tobacco rod;

the battery supplies input power for the PCBA control panel, and the PCBA control panel is electrically connected to the short contact member and the touch member, respectively; (electric connection means connection via leads);

the battery is disposed in the tobacco rod, the tobacco rod being connected to the short contact member via the intermediate threaded connector, the short contact member being disposed inside the intermediate threaded connector via the insulating ring, the tail membrane being connected to the touch member.

As a further improvement of the present invention, the touch battery further includes a PCB bracket. The PCB bracket is used for securing the PCBA control panel and disposed inside the tobacco rod.

As a further improvement of the present invention, the touch battery further includes a securing ring. The touch member is disposed in the middle of the securing ring. The tail membrane is disposed on the bottom of the securing ring.

As a further improvement of the present invention, the PCBA control panel is provided with LED indicators, and the battery is a single lithium battery cell or constant-voltage output battery.

As a further improvement of the present invention, the touch member is a capacitive touch member. The capacitive touch member is round, rhombic, boxed, checkered, or convex-concave.

As a further improvement of the present invention, the capacitive touch member further includes a protection structure which covers capacitive lattice points.

As a further improvement of the present invention, the touch member is secured inside the PCB bracket, and the bottom of the bracket is of a recessed structure.

As a further improvement of the present invention, the touch member is disposed on the bottom of an electronic cigarette, in the middle of the electronic cigarette or at the atomizer portion.

As a further improvement of the present invention, the touch battery includes a control circuit. The control circuit includes a primary IC control portion and a touch control portion. The primary IC control portion and the touch control portion perform control by means of selection of an input mode. The primary IC control portion is connected to an atomizer via an output control portion. The primary IC control portion controls the indicators, while the touch control portion controls the touch member. A power supply supplies electric energy for the primary IC control portion and the touch control portion.

As a further improvement of the present invention, the PCB bracket is provided thereon with a diaphragm for indicating the working state.

In the present invention, applying touch technology to electronic cigarettes is a revolution of the electronic cigarette technology refresh, breaking the conventional way of working with keys, thus meeting the demands of consumers for multiple selections. At present, many consumers complain that keys may be disabled or stuck after long-term use due to limited number of times or varied quality. The demands of consumers and the requirements on the service life are fully satisfied in the present invention.

The touch battery provided by the present invention is very convenient in operation. The electronic cigarette can start to work as long as a person touches the bottom lightly with a finger. The electronic cigarette provided by the present may be carried around and will not work when touched by clothes. When put in clothes, the conventional electronic cigarettes with keys may work sometimes if the keys are pressed unconsciously, so there is a certain issue of safety.

DETAILED DESCRIPTION OF THE PREFERRED EMBODIMENTS

Figure 1:
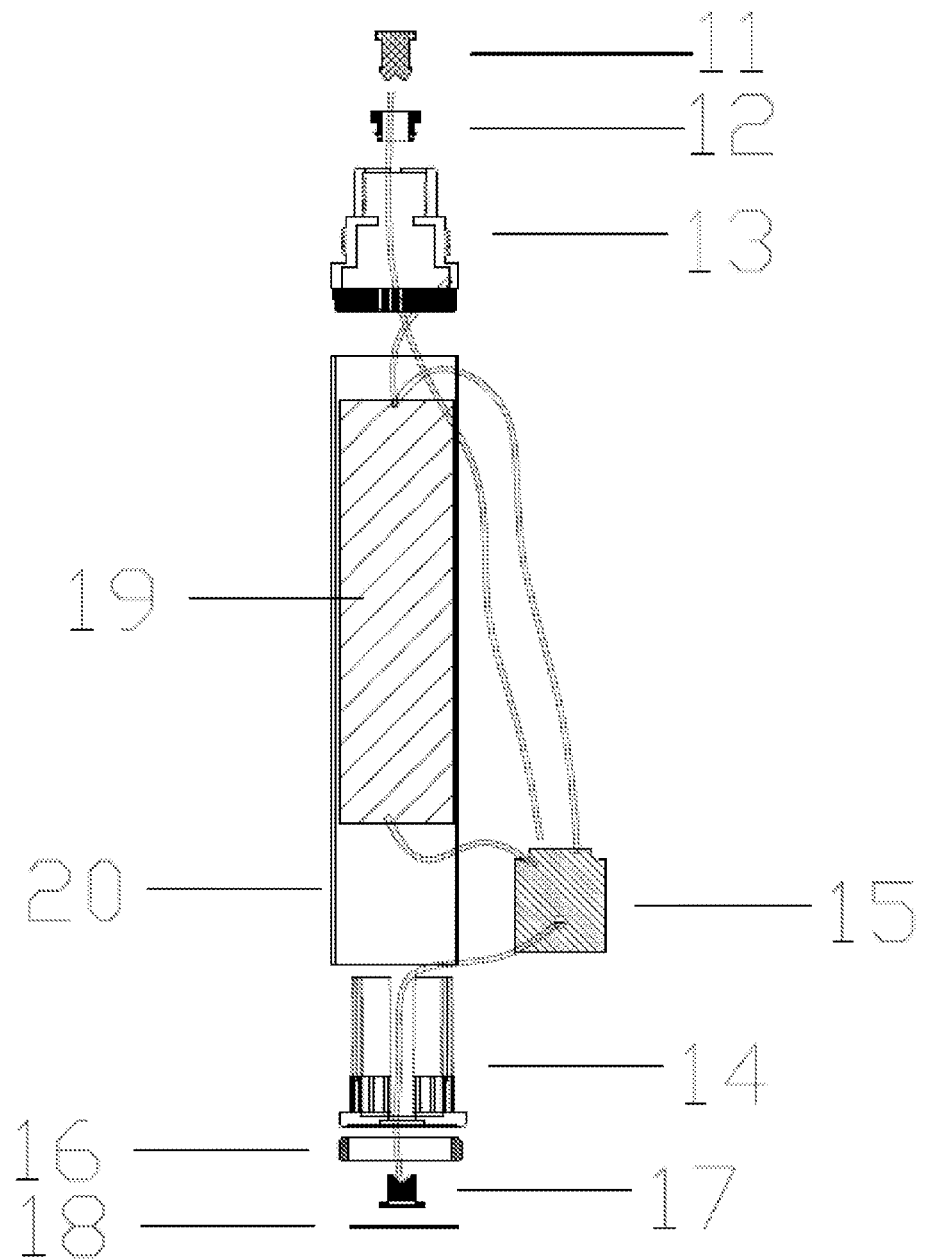
FIG. 1 is an exploded structure view of the present invention.
Figure 2:
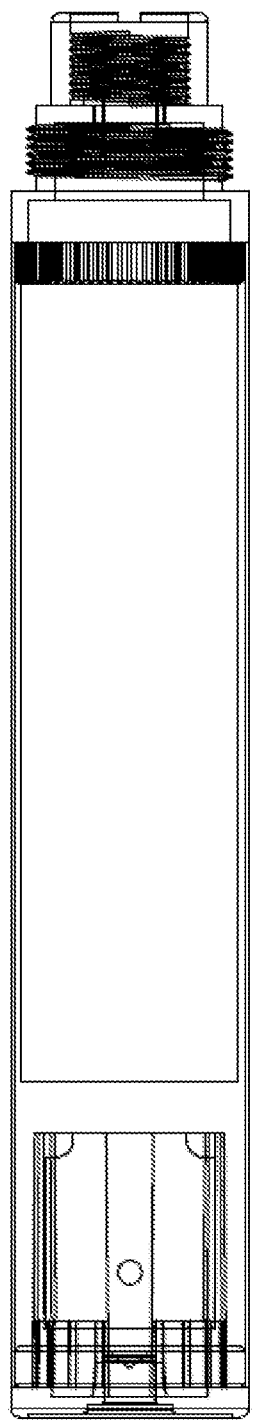
FIG. 2 is a front view of the present invention.
Figure 3:
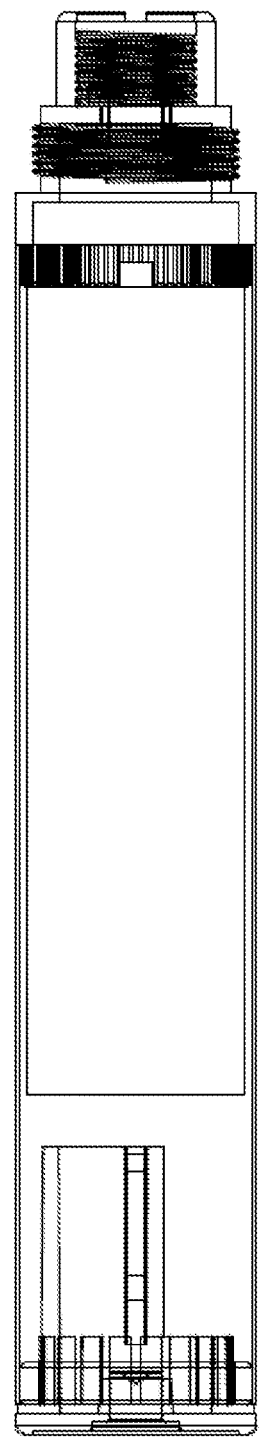
FIG. 3 is a right view of the present invention.
Figure 4:
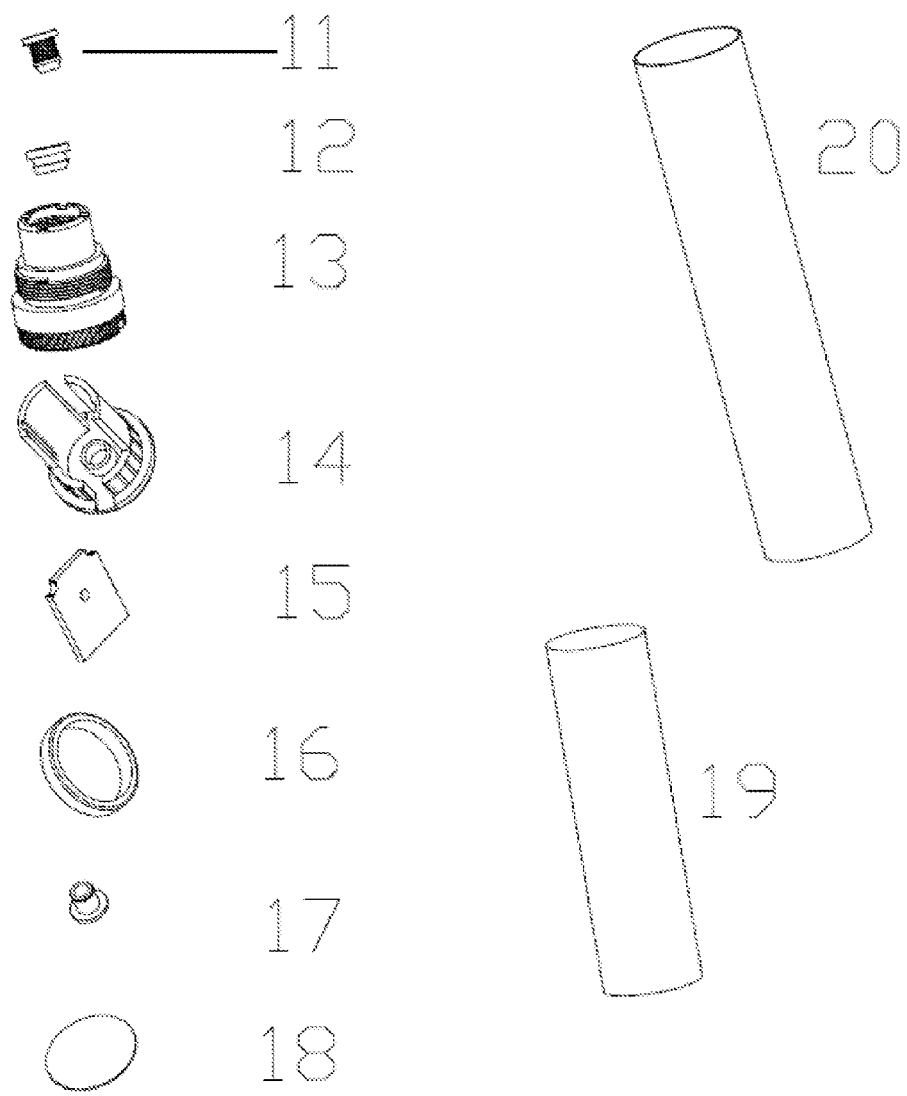
FIG. 4 is a three-dimensional exploded structure view of the present invention.
Figure 5:
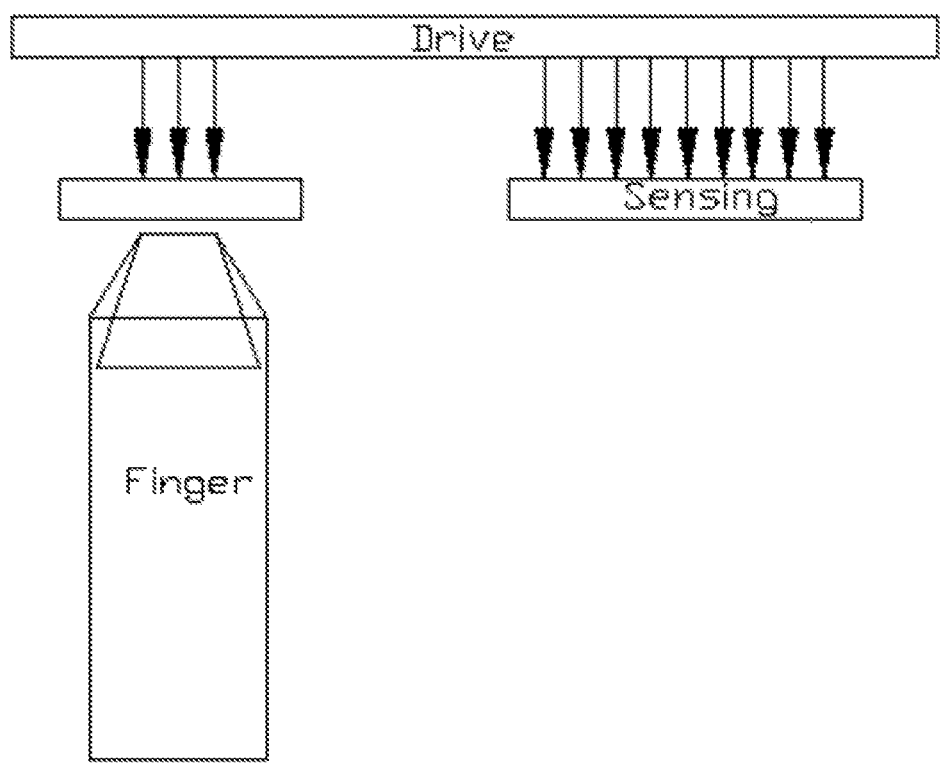
FIG. 5 is a principle diagram of mutual-capacitive touch with a finger.
Figure 6:
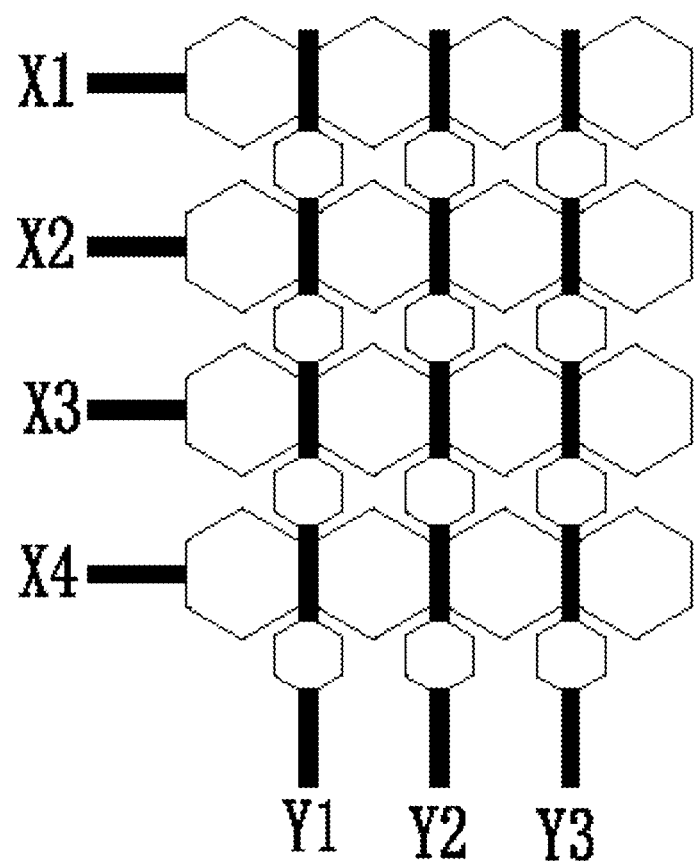
FIG. 6 is a principle diagram of mutual-capacitive touch.
Figure 7:
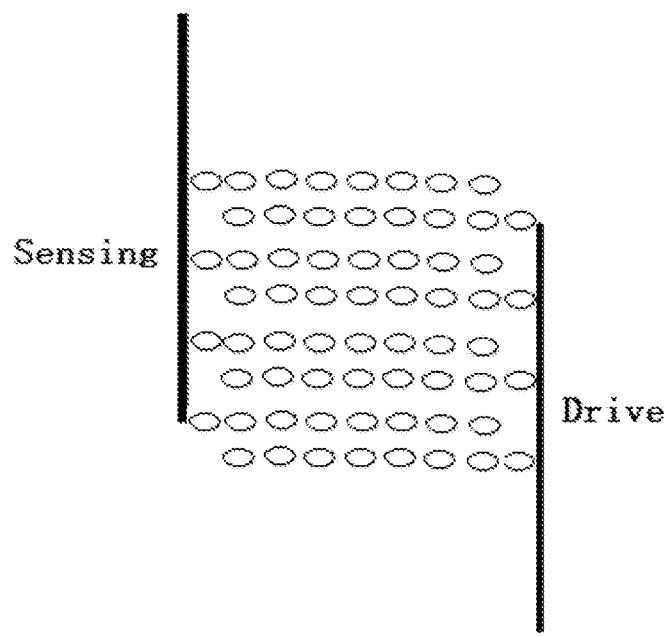
FIG. 7 is a structure diagram of capacitive lattice points implementing mutual-inductance on a single plane.
Figure 8:
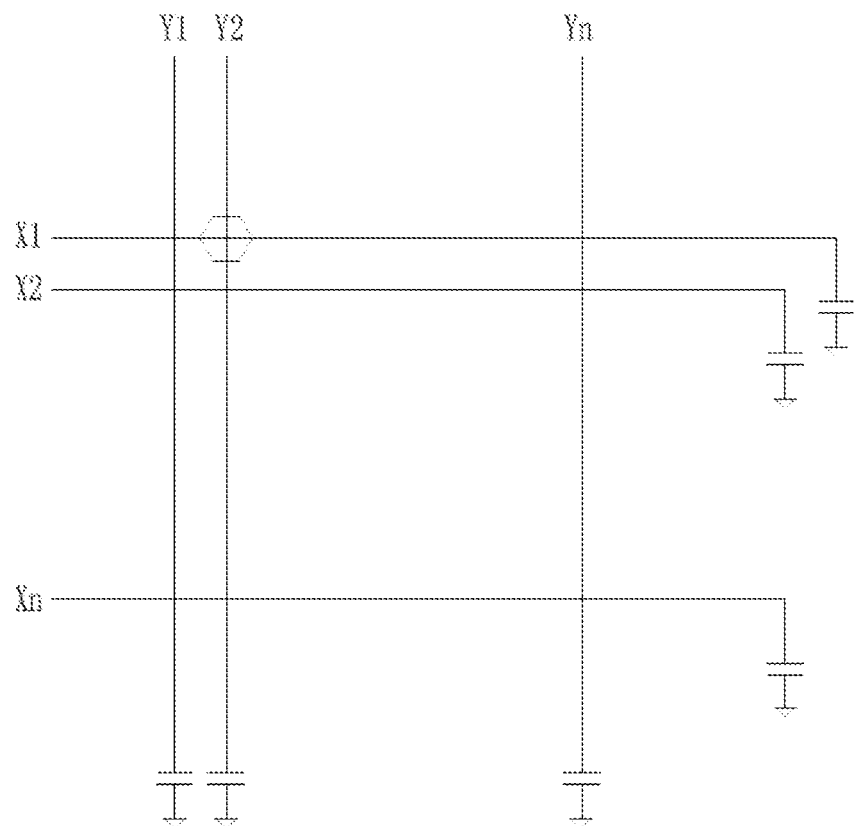
FIG. 8 is a principle diagram of existing self-capacitive touch.
Figure 9:
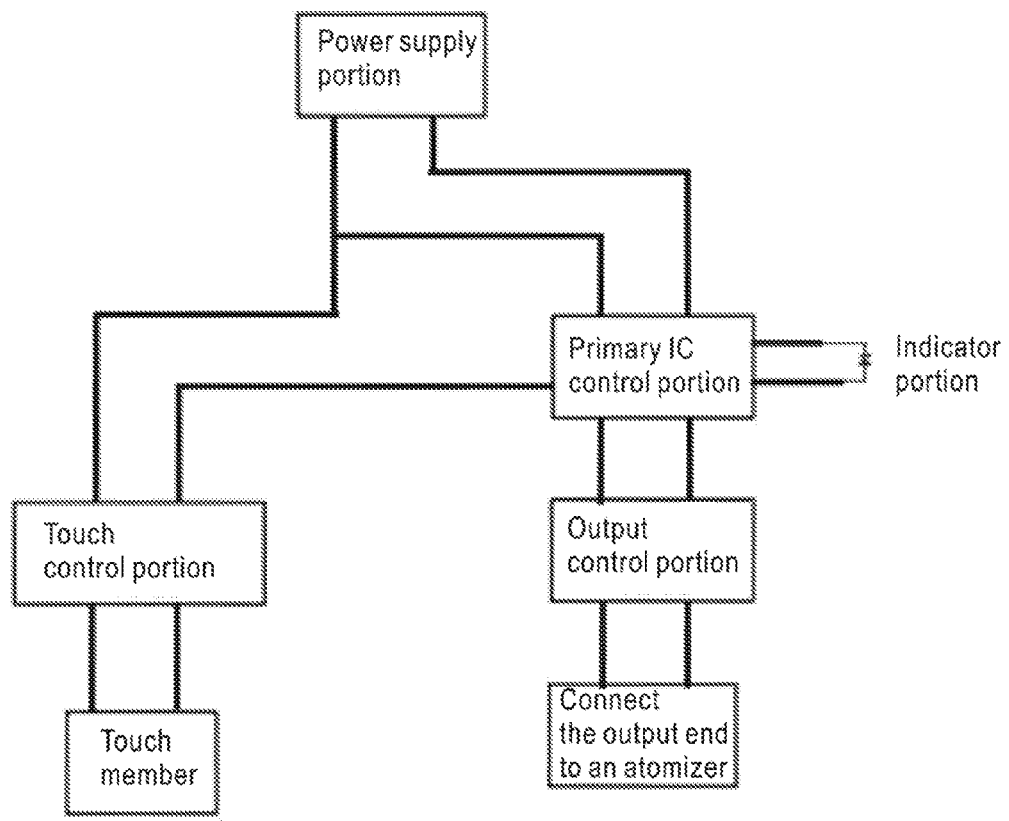
FIG. 9 is a principle block diagram of the present invention.

The present invention will be further described as below with reference to accompanying drawings.

The present invention relates to an electronic cigarette having a single lithium battery cell, characterized by constant-voltage output and touch suction on its bottom. The battery can be triggered to work only by the temperature of a human body rather than touch of the clothes, and the battery thus may be carried around. The conventional way of batteries with keys is avoided, and the demands of consumers for multiple sections are met. The battery is charged in a conventional manner, and has a touch portion on its bottom. The battery starts to work as long as a user touches the bottom lightly with the little finger, and then the user may smoke.

The touch battery includes a short contact member 11, an insulating ring 12, an intermediate threaded connector 13, a PCBA control panel 15, a touch member 17, a tail membrane 18, a battery, a battery pole 19 and a tobacco rod (20). The characteristics and interrelation of the components are as follows: after a finger touches the tail membrane 18 on the bottom of the battery, the battery start to work via the touch member 17, and then an LED indicator on the PCBA control panel 15 will turn on; the PCB bracket 14 plays a role of securing the PCBA; the battery supplies input power for the PCBA control panel 15, and is then connected to the intermediate threaded connector 13 by an output and connected to an atomizer via the short contact member 11, so that smoking is achieved. After 10 seconds of smoking and the LED indicator flickers for 8 times, it is required to touch again for another time of smoking as the battery has functions of locking and unlocking. At the end of smoking, the battery may be put into a pocket and carried around.

With respect to the prior art, during the implementation of the present invention, the capacitive touch member is made into a round metal member. The general principle of the capacitive touch technology is as follows: many capacitive lattice points are formed in a capacitive touch region, and the capacitance of a corresponding capacitive lattice point will change when the capacitive lattice point is touched with a finger, so that touch information may be acquired. However, when the touch area of an electronic cigarette is very small, touching with a finger may cover the whole plane of the touch member. By using the round metal member provided by the present invention as a touch surface, according to the principle of the prior art as shown and the practical structure of an electronic cigarette, it is required to calculate capacitive lattice points on software in advance, so that the touch information may be acquired by a small touch object to trigger the electronic cigarette to work.

In addition, the capacitive touch member may be made into different shapes, for example, round, rhombic, boxed, checkered, or convex-concave. The capacitive lattice points may be distributed in any common manner, as long as such distribution is convenient for capacitance detection.

In addition, when acquiring touch information, the capacitive touch member performs capacitance detection in a self-inductance manner or a mutual-inductance manner. As a result, the capacitance detection manner of the capacitive touch member will not be limited after it has been extended in structure, and the touch detection method is similar to the existing planar touch, so that the capacitance of a capacitive lattice point is determined by experiments, without increasing the difficulty of detection.

In addition, the capacitive touch member further includes a protection structure which covers the capacitive lattice points. The capacitive lattice points may be protected by enclosing the capacitive lattice points inside the PCB bracket of the protection structure, so that external environmental factors may be effectively avoided from influencing the capacitance detection. Consequently, the touch information may be acquired accurately.

In addition, the capacitive touch member is secured inside the PCB bracket and the bottom of the bracket is formed to be a recessed shape. As the surface of a finger is arced, the finger is in better contact with the touch member, so that the touch information may be acquired more accurately.

In addition, as the capacitive touch member is influenced by the structure of the electronic cigarette, the touch member may be disposed on the bottom of an electronic cigarette, in the middle of the electronic cigarette or at the atomizer portion. The above structures may be implemented by the functions of the present invention.

A primary IC control portion of the capacitive touch portion provided by the present invention scans and determines capacitive lattice points of a touch portion via an input mode, so that touch parameters on a touch chip may be flexibly modified and set by the primary IC. During the use of the capacitive touch portion, on account of external environmental factors and the size of the touch capacitive lattice points, the touch parameters and the size of the touch plane are determined by experiments in order to ensure that the electronic cigarette has the best touch effect.

The diaphragm of the PCB bracket and the indicator portion indicate different working states.

When the finger of a user touches the tail of the touch member, the LED indicator keeps on normally, and the diaphragm of the PCB bracket gives out light. Meanwhile, the atomizer emits heat and generates smoke. When the finger leaves the touch member, the indicator will turn off, and the atomizer does not emit heat any more and stops working. When the finger touches the touch member again, the LED indicator keeps on normally.

When the voltage of the battery is greater than 3.8V, a white LED indicator turns on; when the voltage of the battery is 3.5V-3.8V, a blue LED indicator turns on; and when the voltage of the battery is less than or equal to 3.5V, a red LED indicator turns on. Through the three colors of LED indicators, a user knows the current use situation. If the red LED indicator turns on, it is indicated that the battery needs to be charged.

When a finger touches the tail of the touch member and the surface of the membrane and then holds and the time for smoking is greater than 10 s, the current voltage LED indicator of the battery flickers for 8 times to remind of time out. After the LED indicator flickers, the user may continue to smoke.

Smoking after the voltage of the battery is lower than 3.2 V: the red LED flickers for 10 times to remind of charging. Hereafter, smoking cannot be performed when the finger touches the tail of the touch member until the battery is charged by a charger successfully.

LOCK/UNCLOCK: LOCK/UNCLOCK is touched continuously for 5 times within 2 s, then the white, blue and red LED indicators simultaneously flicker for 3 times.

When the battery is connected to a charger, the while, blue and red LEDs simultaneously flicker for 3 times to remind a user that the battery has been connected to the charger well, and the charging to the system is started. During charging, an LED indicator keeps on normally (the red indicator turns on when the voltage of the battery is below 3.5 v, the blue indicator turns on when the voltage of the battery is 3.5 v-3.8 v, and the white indicator turns on when the voltage is greater than 3.8 v). During charging, when the charger is taken off, the white, blue and red LED indicators simultaneously flicker for 3 times.

To meet the operational convenience of different people in turning on/off the battery, bottom touch is designed to meet the demands of consumers. The touch member is connected to the atomizer via the intermediate threaded connector in a contact manner. The atomizer may work once a finger touches the bottom of the battery. The bottom touch is designed to be recessed shape, so that the area contacted by a finger is broad when the finger touches the bottom, the finger thus better contacts with the touch member to enable the battery to work.

The detection is performed by the charge level, at a contact point, of the finger of a user. The finger or the touch member is determined by monitoring the small change in capacitance. When the battery starts to work, the LED indicators at the indicator control portion on the PCBA turn on, and a heating coil connected to the atomizer portion via the threaded touch member generates heat. A series of atomizers in market, for example, CE4, CE8, CE9, etc., may be applicable to this electronic cigarette. The resistance of the heating coil may be 1 Ohm at minimum, so that the worry of numerous consumers that an atomizer having low resistance cannot be applicable to this electronic cigarette is relieved. When a finger touches the touch member, 3.7 v voltage passes through two ends of the heating coil, and the heating coil generates heat to burn tobacco tar. Then, by the airflow produced by the smoking of the user, the smoke generated by burning the tobacco bar is taken out from the inside of the atomizer and then comes out from the cigarette holder. Thus, smoking is realized. When a user does not want to smoke now, the user may let the finger leave the touch member; and when the user wants to smoke later, the user needs to touch the touch member on the bottom. When the time of one smoking exceeds a preset time, the indicator under a corresponding electric quantity will flicker for several times to remind the user of time out; and when the user wants to smoke later, the user needs to touch the touch member on the bottom again. If the user does not want to smoke, the electronic cigarette gets into standby to save power. When the touch member is continuously touched for 5 times, the electronic cigarette gets to be locked. In this case, a user cannot smoke by the electronic cigarette unless the touch member is touched for 5 times again.

The foregoing is further detailed description of the present invention with reference to specific preferred embodiments, and will not be regarded as any limitation to the specific embodiments of the present invention. It will be understood by an ordinary person of kill in the art that the present invention may have various simple deductions or replacements without departing from the idea of the present invention, and those deductions or replacements shall fall into the protection scope of the present invention.

What is claimed is:

1. A touch battery, comprising a short contact member (11), an insulating ring (12), an intermediate threaded connector (13), a printed circuit board assembly (PCBA) control panel (15), a capacitive touch member (17) activated by touch of a user, a tail membrane (18), a battery pole (19) having a battery provided therein and interposed between the PCBA control panel and the intermediate threaded connector, and a tobacco rod (20), wherein the battery supplies input power for the PCBA control panel (15), the PCBA control panel (15) is electrically connected to the short contact member (11) and the capacitive touch member (17), respectively; the battery (19) is disposed in the tobacco rod (20), the tobacco rod (20) is connected to the short contact member (11) via the intermediate threaded connector (13), the short contact member (11) is disposed inside the intermediate threaded connector (13) via the insulating ring (12), and the tail membrane (18) is connected to the capacitive touch member (17), wherein the touch battery further comprises a securing ring (16), the capacitive touch member (17) being disposed in the middle of the securing ring (16), and the tail membrane (18) being disposed on the bottom of the securing ring (16).

2. The touch battery according to claim 1, further comprising a PCB bracket (14), the PCB bracket (14) securing the PCBA control panel (15) and disposed inside the tobacco rod (20).

3. The touch battery according to claim 1, wherein the PCBA control panel (15) is provided with LED indicators and the battery is a single lithium battery cell or constant-voltage output battery.

4. The touch battery according to claim 1, wherein the capacitive touch member is round, rhombic, boxed, checkered, or convex-concave.

5. The touch battery according to claim 4, wherein the capacitive touch member further comprises a protection structure which covers capacitive lattice points.

6. The touch battery according to claim 2, wherein the capacitive touch member is secured inside the PCB bracket and the bottom of the bracket is of a recessed structure.

7. The touch battery according to claim 1, further comprising a control circuit, the control circuit comprising a primary IC control portion and a touch control portion, the primary IC control portion and the touch control portion performing control by means of selection of an input mode, the primary IC control portion being connected to an atomizer via an output control portion, the primary IC control portion controlling the indicators, the touch control portion controlling the touch member, a power supply supplying electric energy for the primary IC control portion and the touch control portion.

8. The touch battery according to claim 2, wherein the PCB bracket is provided thereon with a diaphragm for indicating the working state.

* * * * *